United States Patent [19]

Yamazaki

[11] Patent Number: 4,661,800
[45] Date of Patent: Apr. 28, 1987

[54] FLICKER LAMPS FOR A CAR

[75] Inventor: Tomio Yamazaki, Tokyo, Japan

[73] Assignee: Yugen Kaisha Yamazaki Jutaku Kanri, Tokyo, Japan

[21] Appl. No.: 729,322

[22] Filed: May 1, 1985

[30] Foreign Application Priority Data

Jan. 21, 1985 [JP] Japan .................................. 60-7366

[51] Int. Cl.⁴ ............................................ B60Q 1/00
[52] U.S. Cl. ........................................ 340/98; 340/73; 340/81 R
[58] Field of Search .................. 340/73, 72, 98, 100, 340/81 R, 84, 134

[56] References Cited

U.S. PATENT DOCUMENTS

| D. 89,776 | 5/1933 | Luertzing | 340/100 |
| 2,010,138 | 8/1935 | Condon | 340/100 |
| 2,561,582 | 7/1951 | Marbel | 340/98 |
| 2,600,751 | 6/1952 | Gazda | 340/98 |
| 3,430,229 | 2/1969 | Ornas, Jr. et al. | 340/98 |

Primary Examiner—James L. Rowland
Assistant Examiner—Jeffery A. Hofsass
Attorney, Agent, or Firm—Flynn, Thiel, Boutell & Tanis

[57] ABSTRACT

Flicker lamps for a car are disclosed, which are provided on the outer end of door mirrors or fender mirrors of the car, so that a driver of a motorcycle or the like running aside the car can readily recognize their flickering.

4 Claims, 8 Drawing Figures

FLICKER LAMPS FOR A CAR

BACKGROUND OF THE INVENTION

1. Field of the Invention

The invention relates to flicker lamps which are flickered when a car turns to the left and right and, more particularly, to the position of installation of flicker lamps.

2. Prior art

The flicker lamp is flickered when the car turns to the left and right. FIG. 8 shows a car 1 which has flicker lamps 2 installed on a front portion F, a rear portion R and side portions S.

The flicker lamps 2 provided on the side portions S serve to inform a driver of a motorcycle or the like running aside the car 1 of the left or right turn of the car.

With conventional flicker lamps 2 provided on the side portion S of the car, however, its flickering is very difficultly recognizable by a driver of a motorcycle running aside and at a very small distance from the car. In such a case, the motorcycle is running at a considerably high speed, and its driver also has to exercise care in its forward direction. Therefore, the difficulty of recognizing the flickering of the flicker lamps 2 provided on the side of the car is very dangerous. More particularly, the overlooking of the flickering of the flicker lamps 2 on side portion S of the car 1 going to make a turn by the driver of motorcycle running straight often results in a contact accident between the car 1 and the motorcycle.

SUMMARY OF THE INVENTION

An object of the invention is to install flicker lamps on a side portion of a car at a position, at which the flicker lamp can be readily recognized by a driver of a motorcycle running aside the car, thus preventing an otherwise possible contact accident between the car and motorcycle.

A feature of the invention resides in that the flicker lamps are provided on the outer edge of a door mirror or a fender mirror projecting from each side of the car.

DESCRIPTION OF THE PREFERRED EMBODIMENTS

Now, preferred embodiments of the invention will be described with reference to FIGS. 1 to 7.

Figure 1:
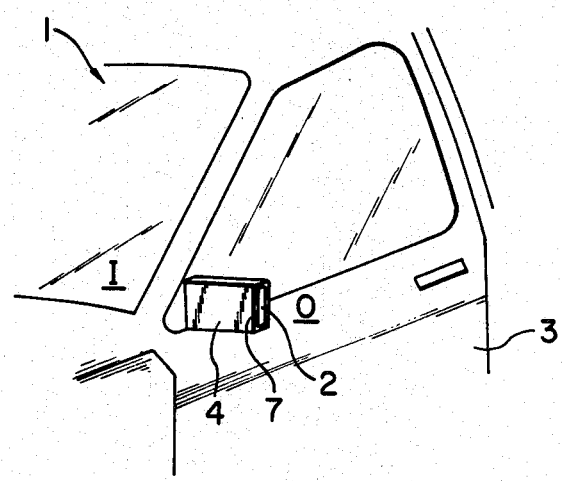
FIG. 1 is a fragmentary perspective view showing the neighborhood of a door mirror of a car incorporating an embodiment of the invention.
Figure 2:
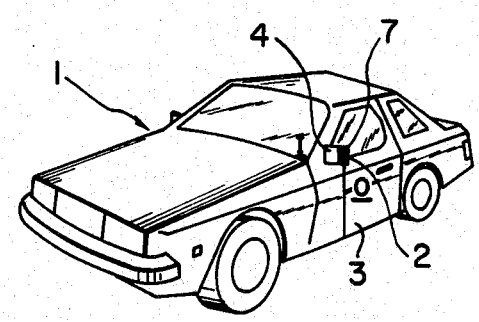
FIG. 2 is perspective view, to a reduced scale, showing the car shown in FIG. 1.
Figure 3:
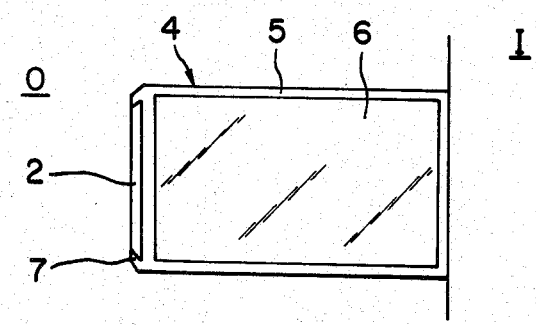
FIG. 3 is a view looking to the front of the car, to an enlarged scale, showing the door mirror shown in FIG. 1.
Figure 4:
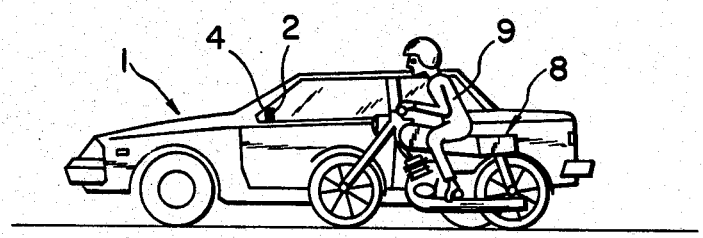
FIG. 4 is a side view showing the car of FIG. 1 and a motorcycle running aside the car.

FIGS. 1 to 4 show a first embodiment of the invention. Referring to the figures, each door 3 of a car 1 has an outwardly projecting door mirror 4. As shown in FIG. 3, the door mirror 4 has a mirror 6 provided on a side 5 looked at by the driver.

The left and right sides of the car 1 with respect to the forward direction of the car are labeled O and I, respectively. The door mirror 4 outwardly projecting from the left side O of the car has a flicker lamp 2 provided along its outer edge 7.

The flicker lamp 2 is provided along the outer edge 7 of the left side door mirror of the car in order to reduce as much as possible the flickering light of the flicker lamp 2 entering the eyes of the driver when the driver looks at the mirror 6 of the door mirror 4 and hence prevent the driver from being dazzled.

Since the door mirror 4 outwardly projects from each side of the car, a driver 9 of a motorcycle 8 running aside the car can very readily recognize the flicker lamp 2 by sight.

In addition, since the door mirror 4 is naturally located at a position on the driver's eyesight line, the flicker lamp 2 provided on the door mirror 4 can also be readily recognized by the driver of another car (not shown) running aside the car 1.

Figure 5:
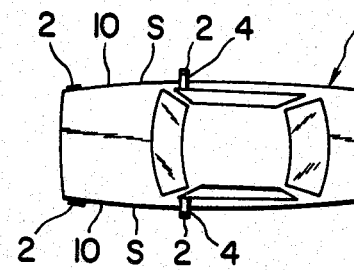
FIG. 5. is a plan view showing a car, the width of which becomes smaller toward the front end.

In case of the car 1, the width of which becomes smaller toward the front end as shown in FIG. 5, flicker lamps 2 provided front portions of the sides S of the car 1 are very difficultly recognizable by a driver 9 of the motorcycle 8 running aside the car 1. For this reason, the provision of the flicker lamp 2 on the door mirror outwardly projecting from the side of the car is particularly important.

The invention covers the car 1 as well, which has the flicker lamps 2 provided on the door mirrors and also the conventional flicker lamps 2 provided on front portions 10 of the sides S.

Figure 6:
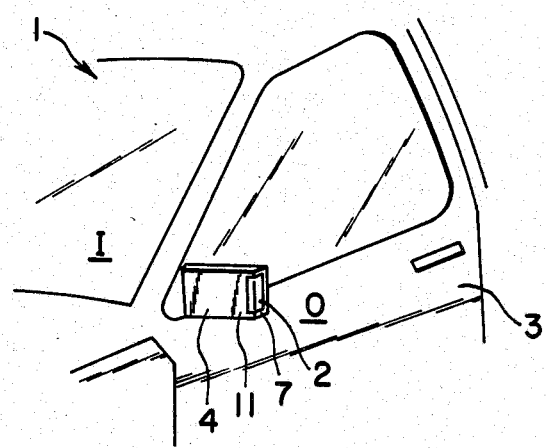
FIG. 6 is a fragmentary perspective view showing the neighborhood of the door mirror of the car incorporating a different embodiment of the invention.

FIG. 6 shows a different embodiment of the invention, in which a flicker lamp 2 is provided on the outer edge of a door mirror 4 projecting from the left side O of the car such that the flicker lamp 2 extends in the longitudinal direction of the car.

Figure 7:
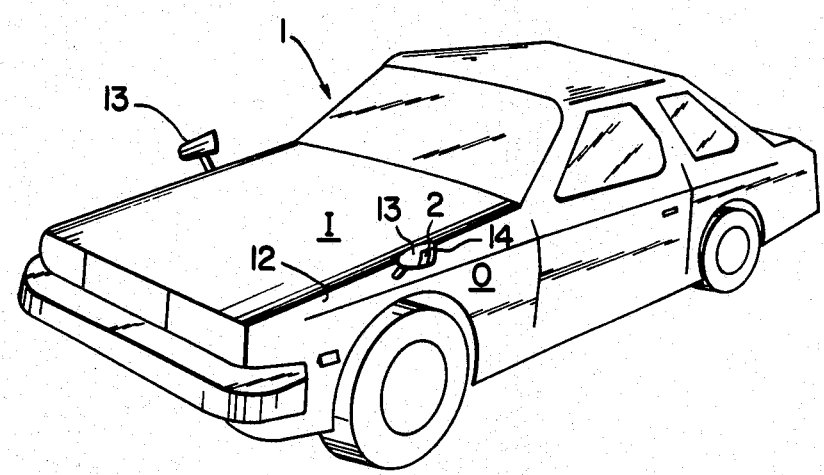
FIG. 7 is a perspective view, showing a car incorporating a further embodiment of the invention.
Figure 8:
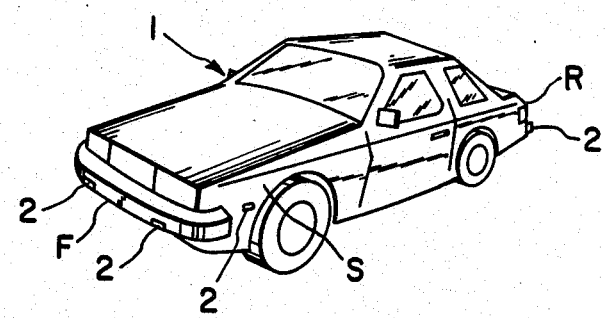
FIG. 8 is a perspective view illustrating conventional positions of installation of flicker lamps on the car.

FIG. 7 shows a further embodiment of the invention. In this instance, a flicker lamp 2 is provided on a fender mirror 13 projecting from a fender 12 of a car 1. Again in this case, the flicker lamp 2 is provided on the outer edge 14 of the fender mirror 13 projecting from the left side of the car.

ADVANTAGES OF THE INVENTION

According to the invention, the following advantages can be obtained.

Since the flicker lamps are outwardly projected from the side of the car, it can be readily recognized by a driver of the motorcycle running aside the car, which is highly effective for preventing traffic accidents.

Since the flicker lamps are installed on the door mirror or fender mirror so that they are outwardly projected from the side of the car, there is no need of providing any bracket for having the flicker lamps outwardly projected from the side of the car.

Further, since the door mirror or fender mirror is at the eyesight level of the driver, the flicker lamps can be installed at a convenient level, i.e., neither too high nor too low. Also, the flicker lamps can be at such a level that it can be readily recognized by the driver of a different car running aside.

Further, since the flicker lamps are not installed as an independent fixture but is installed on a fender mirror or door mirror which is provided on the car, it will never damage the car or spoil the appearance thereof.

Further, since the door mirror is usually substantially at the longitudinal center of the car, a driver of a motorcycle, who can only with difficulty recognize a flicker lamp that is provided on a fender mirror or a rear portion of the car, can readily recognize the flickering of a flicker lamp provided on the door mirror.

Moreover, while a fender mirror is located at a position somewhat forwadly spaced apart from the driver, the door mirror is usually located aside the driver, so that the flickered light of the flicker lamps provided at the outer edge of the door mirror projecting from each side of the car will have very little influence on the driver's eyes compared to the flickered light of the flicker lamp provided on a fender mirror.

The foregoing is explained for the car keeping to the left. For the car keeping to the right, the right side of the car is important for preventing a contact accident between the car and the motorcycle running at the right side of the car.

What is claimed is:

1. Turn signal apparatus for an automotive vehicle, comprising
   means defining a flickering light turn signal located on the vehicle in the field of view of a motorcyclist or bicyclist riding beside the vehicle and for signaling intention to turn the vehicle across the path of the motorcyclist or bicyclist;
   means for mounting the turn signal on the side of the vehicle in the region of the front door or front fender at about the height of the vehicle belt line, namely of the fender top or bottom of the door glass, said means including a sidewardly projecting box-like housing, said turn signal having a light emitting portion on the laterally outward side face of the housing so as to be visible to a motorcyclist or bicyclist riding beside the vehicle but not to the vehicle driver;
   a rear view mirror on the rear face of said housing for seeing by the vehicle driver of objects to the rear of the vehicle.

2. The turn signal apparatus of claim 1, wherein said turn signal mounting means projects from a door of said vehicle.

3. The turn signal apparatus of claim 1, wherein said turn signal means projects from a fender of said vehicle.

4. The turn signal apparatus of claim 1 in which said light emitting portion extends around to the forward side of said housing.

* * * * *